Oct. 24, 1944.    J. O. OSTERBERG    2,360,886
APPARATUS FOR DETERMINING HYDROSTATIC PRESSURE
Filed May 29, 1942

INVENTOR
JOHN O. OSTERBERG
BY
ATTORNEYS

Patented Oct. 24, 1944

2,360,886

UNITED STATES PATENT OFFICE 2,360,886

APPARATUS FOR DETERMINING HYDROSTATIC PRESSURE

John O. Osterberg, Vicksburg, Miss.

Application May 29, 1942, Serial No. 445,093

9 Claims. (Cl. 177—351)

(Granted under the act of March 3, 1883, as amended April 30, 1928; 370 O. G. 757)

The invention described herein may be manufactured and used by or for the Government for governmental purposes, without the payment of any royalty thereon to me.

This invention relates generally to pressure measuring apparatus but more particularly to a device for the measurement of static or dynamic fluid pressure, as for instance the hydrostatic pressure in soil, the pressure in a liquid, or the pressure in a gas.

One object of the invention is to provide a static and dynamic pressure indicating device in which a pressure responsive unit situated at the place where the pressure exists is connected electrically to a measuring device located at any desired and convenient location therefrom.

Another object of the invention is to provide a pressure indicating device of the type described in which the pressure responsive element functions without any appreciable volume change regardless of the pressure exerted or the distance to the indicating device.

Another object of the invention is to provide a pressure measuring device which instantly indicates or registers pressures, and which functions without the use of moving parts.

With these and other objects in view, the invention consists in certain novel details of construction, combination and arrangement of parts, as will be more fully hereinafter set forth and pointed out in the claims.

In the measurement of pore water pressures in soils of low permeability, difficulty is experienced with existing devices due to the volume change and consequent flow of water required to measure the pressure and to breakage and leaks in the pipe lines.

The present invention eliminates the use of pipes and requires only a three-wire rubber covered cable leading from the pressure responsive unit to an electrical measuring bridge. The only volume change and consequent flow of water required is that necessary to occupy the extremely small space caused by the deflection of a thick diaphragm.

In addition to the measurements set forth above, the pressure indicator which forms the subject matter of this invention can also be used to measure electrically liquid levels, by measuring the pressure of the liquid above the indicator unit. The apparatus can be used to measure pressure surges in water pipe lines, tanks, etc., and can also be used to measure static or dynamic air pressures. By measuring both static air pressure and the dynamic air pressure of wind, the wind velocity relative to any object can be determined by this device.

Referring to the figures in which like parts are indicated by similar reference characters:

Figure 1:
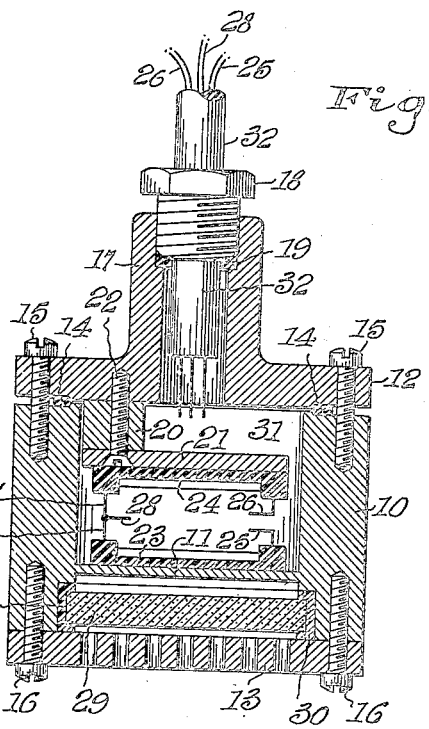
Fig. 1 is an elevation showing a sectionalized view of the pressure responsive unit, the section being taken through the center of the device.

Referring to Fig. 1, the numeral 10 indicates a circular casing having a diaphragm 11 formed integral therewith and provided with a top plate 12 and a perforated bottom plate 13. The top plate 12, which is mounted upon a gasket 14, and the perforated bottom plate 13 are retained to the centrally located casing by means of the screws 15 and 16, respectively.

The top plate 12 is provided with a central upwardly extending tubular portion 17 which is internally threaded for the reception of the gland nut 18 below which is placed the gasket 19. To this nut is attached a tubing through which lead wires from the pressure responsive gauges to the indicating apparatus pass.

Figure 2:
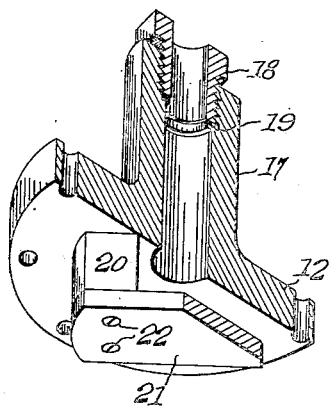
Fig. 2 is a perspective assembly view of the top plate, and dummy gauge sectionalized as in Fig. 1, showing also a sectionalized view of the gland nut.
Figure 4:
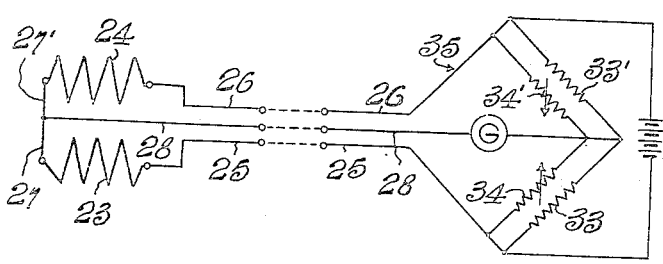
Fig. 4 is a diagrammatic view showing the circuit connections between the pressure responsive gauges and the pressure measuring device.

To the lower surface of the top plate 12 a block 20 and a gauge plate 21 are attached by means of screws 22, as shown in Figs. 1 and 2, and to the oppositely situated surfaces of the diaphragm 11 and the gauge plate 21 are attached respectively an active gauge 23 and a dummy gauge 24 which are connected by leads 25 and 26 and common leads 27, 27' and 28 to the indicating apparatus, as shown in Fig. 4.

The lower extremity of the circular casing 10 is of greater internal diameter than the upper portion and is adapted to receive a porous stone 29 which is surrounded by a packing ring 30, the porous stone being situated intermediate the perforated bottom plate 13 and the diaphragm 11.

The perforated plate 13 and the porous stone 29 keep soil particles from coming into contact with the diaphragm 11, but allows free passage of the pore water to act freely on the diaphragm.

It will be noted that the diaphragm, which is an integral part of the casing, incloses a chamber 31 in which are mounted the strain gauges.

This chamber formed by the casing containing the gauges with air at atmospheric pressure is sealed from external soil, water, or air pressure by the top plate 12 and gasket 14 which are fastened down on the casing by the screws.

Water pressure acting on diaphragm 11 causes it to deflect a small amount. The resulting strain on the inner face of the diaphragm is measured by the electric wire resistance gauge 23 or other suitable strain measuring apparatus cemented or baked to the diaphragm surface. The dummy gauge 24 is attached to the plate 21, in which no strain occurs due to pressure, in order to compensate for temperature.

A three-wire rubber-covered, electric cable 32 has one wire 28 common to the dummy and active gauges, and the other two 25 and 26 connected to the opposite terminals of the active and dummy gauges. The wires lead from the chamber to the measuring apparatus on the ground surface or in some other convenient location, indicated diagrammatically in Fig. 4.

The cable 32 emerges from the chamber 31 through the gland nut 18 and the chamber 31 is sealed from external pressure by tightening the gland nut 18 against the rubber gasket 19.

The three lead wires 25, 26 and 28 from the active and dummy gauge members 23 and 24 are connected to a galvanometer G and to the constant and variable resistances 33, 33' and 34, 34', respectively, of a Wheatstone bridge 35.

The strain gauge, as shown diagrammatically in Fig. 4, consists of a continuously solid metallic wire filament, preferably about 0.001 to 0.003 of an inch in diameter, cemented throughout its entire length to the surface of a member, whose strain (deformation) is to be measured.

The cement may be "Glyptol" or "Duco household cement." The cement serves as an electrical insulation although a thin piece of electrical insulation may be interposed between the filament and surface of the strained member and cemented to each.

The fundamental theory is that the electrical resistance of the filament changes in proportion to its strain. The gauge is an integral part of the diaphragm of the pressure cell to which it is cemented and therefore the strain of the gauge is that of the diaphragm. The gauge filament may consist of what is known by the trade-name of "Advance," "Nichrome," or other similar wire.

To measure the change of resistance of the filament, it is placed so as to form one arm of a Wheatstone bridge, as shown in Fig. 4.

The galvanometer G measures the unbalance of the bridge caused by change of the filament strain. A dummy or inactive filament of the same length and resistance of the active filament is used to form another arm of the Wheatstone bridge as shown. By having the dummy gauge cemented to a plate of the same metal as the diaphragm and placed in the gauge chamber of the pressure cell, the dummy filament compensates for temperature. This is accomplished as follows: Since, for a given temperature change, the change in strain of the diaphragm and the dummy plate is the same and also the resistance change of the filaments is the same, these changes, being of equal magnitude in the dummy and active filaments, will balance out in the circuit and will thereby not affect the galvanometer deflection. The pressure cells are calibrated by measuring the change in resistance of the active filament when strained by the application of a known pressure to the metal diaphragm.

Figure 3:
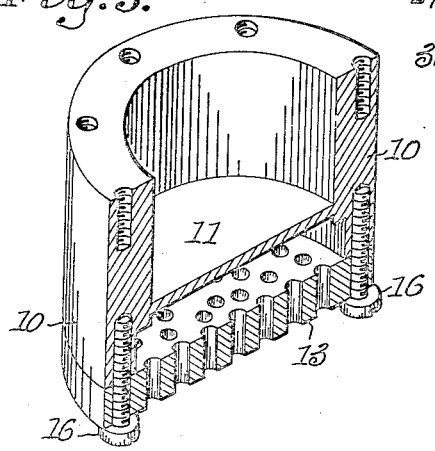
Fig. 3 is a perspective assembly view of the casing and perforated plate sectionalized as shown in Fig. 1.

The diaphragm on which the strain gauge is mounted, as shown in Fig. 3, is the pressure-responsive element of the measuring device. Pore water pressure acts freely on the diaphragm but the soil pressure is prevented from coming in contact with the diaphragm, by the perforated plate 13 and a porous stone 29.

The apparatus as a whole functions as follows: When the pressure cell is buried in soil or submerged in water or placed in an air chamber, fluid pressure strains the pressure-responsive diaphragm, the strain effecting a proportional change in electrical resistance of the wire filament strain gage. This change may be measured by any commercial strain gauge control-box which may be placed in a suitable location and connected to the filaments of the hydrostatic indicator by a three-conductor electric wire rubber-covered cable. The control-box comprises essentially the remaining two arms of a Wheatstone bridge circuit plus the galvanometer G as shown in Fig. 4.

Having described my invention, what I claim as new and wish to secure by Letters Patent is:

1. A device for measuring hydrostatic pressure in soil comprising a casing including a gauge chamber having a diaphragm forming one of the walls thereof, means including a porous stone and a perforated plate adapted to prevent the passage of earth particles to said diaphragm, and an electrical strain gauge including active and dummy elements located within said gauge chamber, said active element being connected to said diaphragm, and means for conductively connecting said gauge to an electrical measuring device.

2. A device for measuring hydrostatic pressure in soil comprising a casing including a gauge chamber and having a diaphragm forming one of the walls thereof, a porous stone located exteriorly to said diaphragm and a perforated plate located exteriorly to said stone, said stone and said plate adapted to prevent the passage of earth particles to said diaphragm, and an electrical strain gauge including an active element and a dummy temperature compensating element located within said gauge chamber, said active element being mounted upon said diaphragm, and means for conductively connecting said elements to an electrical measuring device.

3. A device for measuring hydrostatic pressure in soil comprising a casing including a gauge chamber having a tubular passage therefrom and a thin wall formed integral with said casing exposed to pore water and functioning as a diaphragm, a porous stone located exteriorly to said diaphragm and a perforated plate located exteriorly to said stone, said stone and said plate adapted to prevent the passage of earth particles to said diaphragm, and an electrical strain gauge attached to said diaphragm within said gauge chamber and conductively connected to a measuring device remotely located therefrom by leads sealed within said tubular passage.

4. A device for measuring hydrostatic pressure in soil comprising a casing having a base and a top plate provided with an outlet for the passage of a conducting cable, and a diaphragm located opposite said top plate and enclosing therein a gauge chamber, a flat porous stone fitted within said base adjacent and exterior to said diaphragm and a perforated bottom plate attached to said base adjacent said porous stone, a gauge plate mounted within said gauge chamber, an active gauge attached to said diaphragm and a dummy gauge attached to said gauge plate, and electrical conductors connecting said gauges with an electrical measuring device adapted to measure the change in electrical resistance of said gauges with corresponding changes of pressure on said diaphragm.

5. A device for measuring hydrostatic pressure in soil comprising a casing having a cylindrical base and a circular top plate provided with a tubular projection fitted with a gland nut, for the passage of a conducting cable, and a diaphragm located opposite said top plate and enclosing therebetween a gauge chamber, a disc shaped porous stone fitted within said cylindrical base adjacent and exterior to said diaphragm and a perforated disc shaped bottom plate attached to said circular base adjacent said porous stone, a gauge plate mounted within said gauge chamber, an active gauge attached to said diaphragm and a dummy gauge attached to said gauge, and an electrical conductor connecting said gauge with a remotely located electrical measuring device adapted to measure the change in electrical resistance of said gauges with corresponding changes of pressure on said diaphragm.

6. A device for measuring hydrostatic pressure in soil comprising a casing having a cylindrical base and a circular top plate provided with a tubular projection fitted with a gland nut, for the passage of a conducting cable, and a diaphragm located opposite said top plate and enclosing therein a gauge chamber, a disc shaped porous stone fitted within said cylindrical base adjacent and exterior to said diaphragm and a perforated disc shaped bottom plate attached to said circular base adjacent said porous stone, a gauge plate attached to said top plate within said gauge chamber, an active gauge attached to said diaphragm and a dummy temperature compensating gauge attached to said gauge plate, and an electrical conductor cable connecting said gauges with a remotely located electrical measuring device comprising a Wheatstone bridge adapted to measure the difference in electrical resistance between the active and dummy gauges with corresponding changes of pressure on said diaphragm.

7. In a device of the class described, a casing including a gauge chamber having a diaphragm forming one of the walls thereof, an electrical strain gauge within said chamber including an active and a dummy element, the active element thereof being mounted on said diaphragm, coacting dual means adjacent to and immediately below said diaphragm for removing earth particles from the soil water containing the same, and additional means adapted to conductively connect said gauge to an electrical measuring device.

8. In a device of the class described, a casing including a gauge chamber having a diaphragm forming one of the walls thereof, an electrical strain gauge within said chamber including an active and a dummy element, the active element thereof being mounted on said diaphragm, and the dummy element being attached to a support above said diaphragm, coacting dual means immediately below and vertically spaced from said diaphragm for removing earth particles from the soil water containing the same, and additional means adapted to conductively connect said gauge to an electrical measuring device.

9. In a device of the class described, a casing including a gauge chamber having a diaphragm forming one of the walls thereof, an electrical strain gauge within said chamber including an active and a dummy element, the active element thereof being mounted on said diaphragm, and the dummy element being attached to a support above said diaphragm, combined porous and perforate vertically spaced filtering means immediately below said diaphragm for removing earth particles from the soil water contacting the same, and means adapted to conductively connect said gauge to an electrical measuring device.

JOHJ O. OSTERBERG.